United States Patent Office 2,933,422
Patented Apr. 19, 1960

2,933,422

PRODUCT AND METHOD FOR COATING METALS WITH COPPER-TELLURIUM COMPOUND

Walter A. Mason, Minneapolis, Minn.

No Drawing. Application May 31, 1957
Serial No. 662,560

6 Claims. (Cl. 148—6.24)

My invention relates to a product and method for coating a variety of metals with a copper-tellurium compound, and specifically, copper tellurate.

As evidenced by my co-pending applications, one entitled "Product and Method for Effecting a Cold Chemical Oxidation of Aluminum and Its Alloys," Serial No. 535,740, filed September 21, 1955, now U.S. Patent No. 2,846,343, and one entitled "A Product, Method of Making the Product and Method for Effecting a Cold Chemical Oxidation of Brass and/or Copper and Their Alloys," Serial No. 544,056, filed October 31, 1955, now U.S. Patent No. 2,878,149, I have done considerable development work to provide suitable blue or blue-black coatings for aluminum and its alloys, copper and brass and their alloys, using primarily a copper selenate solution. At the same time, I was able to develop experimental solutions using tellurium as a substitute for the selenium. However, my original development work indicated that selenium compounds were preferable to tellurium compounds for the reason that the tellurium experimental solutions were not too effective in many cases to produce the coatings desired and the selenium compounds were more readily soluble and easier to put into solution. The high cost of selenium compounds, and particularly selenium dioxide, substantially obsoleted my copper selenate coatings from a cost standpoint; and the instant invention is the result of development of coatings similar to copper selenate coatings but which would be commercially desirable from a cost standpoint.

My work with tellurium compounds in the development of the instant invention has surpassed my prior development work with selenium to the extent that I have been able to produce more versatile solutions capable of coating a variety of metals and capable of providing a selectable variation of the color of the coating. My invention has proven itself to be extremely important commercially. First, I am able to provide a substantially permanent blue, blue-black, or the like coating to a variety of metals, and including aluminum and its alloys, iron and steel, and copper and copper alloys. With respect to copper and copper alloys, I am able to provide a wide variety of colors and have been able to reproduce surface finishes which heretofore have been accomplished solely by time-consuming and expensive hand processes. A primary object of my invention is to provide, through the use of cheap, easily applied, and effective solutions, the effect of a cold chemical oxidation of metallic surfaces.

More specifically, it is an object of my invention to provide solutions capable of effecting a plating on various metal surfaces of copper tellurate which can provide highly desirable permanent coatings which have heretofore either been impossible to effect or effected only by time-consuming expensive hand processes.

Referring now more particularly to my invention, it basically comprises a solution of copper tellurate which upon application to a metallic surface is capable of transferring the copper tellurate from solution as a coating on to the metallic surface. In connection with this basic definition of my invention it exemplifies or illustrates two basic problems overcome by my invention. The first of these is the problem of providing a stable solution of copper tellurate; and the second, is the problem of effectively transferring the copper tellurate out of solution as a coating for metallic surfaces. Apart from these basic problems overcome by my invention, there are related problems of providing the proper coating for any desired purpose or effect, and specifically, the problem of providing a proper color or texture of coating desired.

With respect to the general problem of maintaining copper tellurate in a suitable stable solution, there are generally two specific difficulties. First, the copper cation and the tellurium anion, and specifically the tellurate, normally combine to form a precipitate insoluble in water; and second, tellurium itself and any readily available salt thereof, such as tellurium dioxide, are normally insoluble in water for all practical purposes.

Initially, I start with the readily available tellurium dioxide and transform this into sodium tellurate as follows. Specifically, I start with 10 gallons of hot $H_2O$ and dissolve 12½ pounds of NaOH in the hot $H_2O$. I then add 25 pounds of tellurium dioxide which is soluble in a concentrated alkaline solution. Next, I add 1 quart of 35 percent $H_2O_2$ to effect a rapid precipitation of sodium tellurate. The liquid is drained off and the precipitate of sodium tellurate is dried. This provides me with the working compound of tellurium, or in other words, a salt of tellurium which is suitable for use in my novel and improved solution.

The sodium tellurate compound of tellurium, produced as aforementioned, is soluble in a slightly acidic solution, and is therefore particularly suitable for and adapted to provide the tellurium or tellurate in my coating solutions.

Next, in the formation of my novel and improved coating solutions, the sodium tellurate is preferably added to a hot water solution which is at a temperature of approximately 120° F. Although I prefer a hot water solution at approximately the aforementioned temperature, this is not critical and is only for the purpose of effecting a solution of the sodium tellurate as rapidly as possible. I have used tap water at 56° F. to the same end effect; but the time necessary to effect solution of the sodium tellurate upon the addition of acid is lengthened considerably.

Next, acid or acids are added to acidify a solution of the sodium tellurate. Specifically, I add acid which will be compatible with the other elements in the solution to maintain solution and not effect any precipitation of compounds, and acids which will act to cleanse or dissolve the surface oxide of the metallic surface to be coated. Generally, the acid content of the solution may comprise phosphoric acid, nitric acid, hydrochloric acid, or fluoboric acid; and the acid content may comprise any one of said acids or a combination thereof. The preferred specific acids added to the solution are determined by the metals to be coated and the color or effect desired by the solution; and this will be brought out further subsequently. With respect to the acid content of the solutions, I preferably and generally first add an acid in sufficient quantity to approximately neutralize the solution which is one that will make use of the sodium of the sodium tellurate to form a detergent and which detergent will act as a wetting agent in the solution. I have generally used phosphoric acid, which when added to the solution forms a sodium phosphate; however, nitric acid can be used and when added to the solution will form a sodium nitrate.

Thus, after adding the sodium tellurate to the water and with respect to the acid content of the solution, I specifically first add phosphoric acid in sufficient quantity to approximately neutralize a solution of sodium tellurate in water. It should be noted that before the addition of the phosphoric acid, most of the sodium tellurate is a precipitate in the water; initially upon addition of the phosphoric acid, the solution is acidic and the sodium tellurate commences to go into solution; as the sodium tellurate goes into solution, the solution becomes less and less acid; until finally the solution is substantially neutralized when the sodium tellurate is in solution.

Next, further acid is added to acidify the solution; and this further acid is generally nitric, hydrochloric, or fluoboric, or a combination of said acids.

After the solution is acidic, it is then possible to put the copper into solution as a water soluble cupric salt without effecting a precipitation of copper tellurate. Specifically, copper sulphate is to be preferred; however, I have used cupric chloride and I believe that any cupric salt will be effective in my solutions.

The aforementioned steps in the production of my novel and improved coating solutions set forth generally the solution to the problem of providing a stable solution of copper tellurate. In some specific instances, I have found that a solution formed as aforementioned will provide a suitable copper tellurate coating upon application to metallic surfaces; however, I have found that in most cases, and to provide a generally suitable solution, the coating solution must be supplemented with a catalyst or thrower which acts to accelerate the coating process in order to provide a truly effective coating of copper tellurate. This element or ingredient of my coating solution might be referred to as an accelerator, catalyst, or a thrower; and its effect or function in the solution is to throw the copper tellurate out of solution upon application to the metallic surface and on to the surface to be coated. With respect to the general nature of this element or accelerator, it must be soluble in the solution and compatible with the other elements thereof in order to maintain solution and not effect any precipitation. In this regard, the accelerator need not be entirely water soluble but must at least be soluble in a solution which is acid to approximately the same extent necessary to maintain the copper and tellurate in solution. More specifically, I have found that the accelerator must generally be of a class of complex salts in which the anion includes a metal having an oxygen state of the class including plus 5 and plus 6. Specifically, I have found that ammonium molybdate is the preferred accelerator or catalyst. In regard to the catalyst or accelerator, I have used other molybdates including sodium and potassium molybdates; the vanadates; the manganates; and the chromates which are chemically similar to the molybdates and the manganates. I have found that the chromates and molybdates are preferred as catalysts over the vanadates and manganates; and the ammonium molybdate is the mose preferred accelerator of all catalysts tested of the class including molybdates, vanadates, chromates, and manganates.

The aforementioned disclosure sets forth the general nature of my invention and novel and improved coating solutions. With respect to providing a suitable coating for any particular metal or alloy thereof, certain further general considerations must be noted. In this regard, it should be noted first, that the pH of the final solution may be critical to the extent that it must be between certain limits, and second, that the acid content of any specific solution must comprise certain acids or otherwise a true coating is not effected but merely a black smut. It would be difficult to set forth sufficient specific examples to cover all alloys of various metals wherein the specific acid content is recited to effect a suitable coating. My invention is of broader scope than this; and I wish it understood that I do not intend my invention to be limited to the specific examples hereinafter disclosed. I have in this disclosure hereinbefore and hereinafter, laid guide posts for the development of specific solutions to effect a desired result wherein any specific solution may be developed by any mechanic skilled in this art through experimentation with specific proportions of ingredients to form a desired solution. It should be clearly understood that the broad scope of my invention goes beyond any specific examples recited for any specific solution in that the important contribution of my invention to this art lies primarily in the disclosure of the general nature of my invention, and guide posts, including the specific examples, herein set forth with respect to the development of my novel and improved coating solutions.

Specific examples of my novel and improved coating solutions are as follows.

EXAMPLE 1

Example 1 is a blacking or blue-blacking solution for aluminum and aluminum alloys which is particularly adapted for coating by immersion. However, the solution of Example 1 may also be used as a black or blueblack touch-up for bare spots of aluminum and/or aluminum alloys which have been colored or coated by some other process, such as anodizing.

A five gallon solution comprising:

| | | |
|---|---|---|
| Sodium tellurate | ounces | 20 |
| Copper sulfate | do | 20 |
| Phosphoric acid | fluid ounces | 9 |
| Hydrochloric acid | do | 9 |
| Fluoboric acid | do | 9 |
| Zinc sulfate | ounces | 6 |
| Ammonium molybdate | do | 6 |
| Isopropyl alcohol | fluid ounces | 120 |

Water in sufficient quantity to make five gallons of solution.

The above solution is formulated as follows. The sodium tellurate is added to a portion of the water which is heated to approximately 120° F. The phosphoric acid is next added. The hydrochloric and fluoboric acid are next added either separately or in any order or together. The copper sulfate is then added. Next, the ammonium molybdate and zinc sulfate are added to the solution. The isopropyl alcohol is then added. Finally, water is added to make five gallons of solution.

With respect to the above formulation, it might be noted that the copper sulfate is added after the acid in order to provide an acidic solution and prevent the precipitation of copper tellurate. Further, the isopropyl alcohol is added after the copper sulfate and not directly after the acid to prevent a possible interaction between the alcohol and the acid which affects the end result of the solution.

EXAMPLE 2

Example 2 is a solution similar or analogous to Example No. 1 but is particularly adapted for application to aluminum or aluminum alloys by swab or spray, as well as by immersion. As with respect to Example No. 1, the proportions of the ingredients in Example 2 are for a 5 gallon solution.

*Spray and swab on type for aluminum and aluminum alloys*

| | | |
|---|---|---|
| Sodium tellurate | ounces | 20 |
| Copper sulfate | do | 25 |
| Nickel sulfate | do | 12 |
| Zinc sulfate | do | 11 |
| Ammonium molybdate | do | 14 |
| Phosphoric acid | fluid ounces | 25 |
| Hydrochloric acid | do | 10 |
| Isopropyl alcohol | gallons | 3 |
| Aerosol OS | ounces | 3 |

Water to make five gallon solution.

The formulation of the solution of Example No. 2 is the same as with respect to Example No. 1. The aerosol OS would be added in conjunction with or in the same step of the process as isopropyl alcohol and the nickel sulfate would be added in conjunction with or in the same step of the process as the zinc sulfate and ammonium molybdate.

The formulae of the solutions set forth in Examples 1 and 2 produce a bright surface which is approximately a blue-black color. The copper and specifically the copper sulfate may be increased up to 25% to proportionately change the color from a blue-black to a black color. With respect to increasing the amount of copper in solution, it must be noted that additional acid must be used upon an increase of copper in solution. Similarly, if the amount of copper in solution is reduced, the amount of acid in solution would be reduced.

I have also produced a non-reflective optical type solution for use on aluminum and aluminum alloys which is set forth in Example No. 3.

EXAMPLE 3

(A one gallon solution)

| | | |
|---|---|---|
| Sodium tellurate | ounces | 6 |
| Copper sulfate | do | 12 |
| Phosphoric acid | fluid ounces | 2½ |
| Hydrochloric acid | do | 1¼ |
| Ammonium molybdate | ounces | 2 |

Water to make one gallon solution.

A preferred solution to be used as a touch-up for aluminum or aluminum alloys and which is also suitable as a dye is set forth in the following Example No. 4.

EXAMPLE 4

(A one gallon solution)

| | | |
|---|---|---|
| Sodium tellurate | ounces | 5 |
| Copper sulfate | do | 2 |
| Phosphoric acid | fluid ounces | 1 |
| Hydrochloric acid | do | 1½ |
| Zinc sulfate | ounces | 1 |
| Ammonium molybdate | do | 2½ |
| Methanol | fluid ounces | 16 |
| Glycerin | do | 24 |
| Aerosols | ounces | 1 |

Water to make a one gallon solution.

An article of aluminum or an alloy thereof is coated with my novel and improved solution as follows. First, the article is degreased. The surface oxide is then removed in any well known manner. Next, the article is immersed, swabbed, or sprayed with my solution. Next, the article is subjected to a water rinse; and finally, the article is dried.

Specific formulas within my invention for coating or finishing iron and steel are set forth in the following Examples Nos. 5, 6 and 7. Example No. 5 is particularly adapted for immersion type of application; Example No. 6 is particularly adapted for swab and spray application; and Example No. 7 is a touch-up type of solution.

EXAMPLE 5

*Immersion-type formula for use on iron and steel*

(A five gallon solution)

| | | |
|---|---|---|
| Sodium tellurate | ounces | 22 |
| Copper sulfate | do | 13½ |
| Phosphoric acid | fluid ounces | 13⅓ |
| Nitric acid | do | 13⅓ |
| Ammonium molybdate | ounces | 1 |
| Potassium dichromate | do | 3½ |
| Methanol | fluid ounces | 90 |

Water added to make five gallons.

EXAMPLE 6

*Spray and swab on for use on iron and steel*

(A 54 gallon solution)

| | |
|---|---|
| Sodium tellurate | 12 lbs. 13 oz. |
| Copper sulfate | 10 lbs. 9 oz. |
| Phosphoric acid | 72 fluid oz. |
| Nitric acid | 150 fluid oz. |
| Aerosol OS | 12 ounces |
| Methanol | 15 gallons |
| Ammonium molybdate | 2 lbs. 2 oz. |

Water to make 54 gallons.

EXAMPLE 7

*Touch up type for use on iron and steel*

(A five gallon solution)

| | | |
|---|---|---|
| Sodium tellurate | ounces | 30 |
| Copper sulfate | do | 26 |
| Phosphoric acid | fluid ounces | 11 |
| Nitric acid | do | 16 |
| Ammonium molybdate | ounces | 6 |
| Zinc sulfate | do | 4 |

Water to make five gallons.

EXAMPLE 8

Example No. 8 is a solution which is particularly adapted for the coloration or cold chemical oxidation of zinc and zinc alloys and application may be by immersion, spray, swab, or the solution may be used as a touch up. The following formulation is to provide a one-gallon solution.

| | | |
|---|---|---|
| Sodium tellurate | ounces | 8 |
| Copper sulfate | do | 4 |
| Ammonium molybdate | do | 1 |
| Hydrochloric acid | fluid ounces | 4 |
| Aerosol OS | ounces | 1 |

My novel and improved copper tellurate solution has a particularly important application in the coloration of copper and its alloys. It can be used to color bronze, brass, and various alloys of copper. Specific general formulations for use on copper and copper alloys are set forth in Examples Nos. 9, 10, and 11. These examples may be modified in various respects to provide variations of color and this will be referred to in further detail subsequently.

EXAMPLE 9

*Immersion type solution for use on copper and copper alloys*

(A 35 gallon solution)

| | | |
|---|---|---|
| Sodium tellurate | lbs | 14 |
| Copper sulfate | lbs | 14 |
| Zinc sulfate | lbs | 12 |
| Ammonium molybdate | lbs | 6 |
| Phosphoric acid | fluid oz | 98 |
| Nitric acid | do | 96 |
| Fluoboric acid | do | 120 |
| Isopropyl alcohol | gallons | 5 |

Water to make 35 gallons.

EXAMPLE 10

*Spray and swab on type solution for use on copper and copper alloys*

(A 5 gallon solution)

| | | |
|---|---|---|
| Sodium tellurate | oz | 36 |
| Zinc sulfate | oz | 10 |
| Ammonium molybdate | oz | 12 |
| Copper sulfate | oz | 3 |
| Phosphoric acid | fluid oz | 22 |
| Fluoboric acid | do | 22 |
| Glycerin | do | 4 |

Water to make 5 gallons.

EXAMPLE 11

*Touch up type solution for use on copper and copper alloys*

(A 5 gallon solution)

| | |
|---|---|
| Sodium tellurate | oz__ 20 |
| Copper sulfate | oz__ 20 |
| Nickel sulfate | oz__ 5 |
| Zinc sulfate | oz__ 6 |
| Ammonium molybdate | oz__ 8 |
| Phosphoric acid | fluid oz__ 8 |
| Hydrochloric acid | do____ 6 |
| Fluoboric acid | do____ 6 |
| Isopropyl alcohol | do____ 20 |

Water to make 5 gallons.

With respect to the aforementioned specific examples of my novel and improved solution, I have set forth the nature of the procedure in formulating such solutions in the description of specific Example No. 1, and the specific formulation of the solutions as set forth in the other specific examples are formulated in the same manner. With respect to the application of the solutions to any metallic surface, I have set forth the general process of application in the description hereinbefore set forth in column 5, lines 49–55, with respect to the application of a solution to an article of aluminum or an alloy thereof; and the application of the solution to any of the other metallic surfaces is the same as set forth with respect to an aluminum article. The principal exception with respect to the application of my solutions to a metallic surface is with respect to the touch up type of solutions. These have been particularly formulated so that such solutions can be applied by persons normally completely unskilled in the finishing of metals. Normally, the touch up solutions are applied without cleaning the metallic surface and the touch up solutions will apply a coating even through a film of oil. The touch up solutions are particularly adapted for covering scratches or the like in a metallic surface which has been coated with a black oxide or other similar coating. The touch up solutions are applied to a scratch or the like by a dagger or the like. The chemicals of the touch up solutions will not in any way injure a black oxide finish and will not ring spot. They have proven to be very successful for touching up scratches or the like.

To this point in the disclosure of my invention, I have initially set forth the general nature thereof and thereafter certain specific examples for various metallic surfaces. It will be noted that the specific examples contain certain ingredients, and for example, zinc sulfate, isopropyl alcohol, methanol, glycerin, and aerosols, which were not referred to in the discussion of the general nature of my invention. An explanation of the function of these ingredients in my solutions and additional observations as to the nature of my solutions will provide a fuller understanding of my invention.

Tellurium which is the last element of the class of sulfur, selenium and tellurium, is recognized as a blackening agent along with the other elements of the class. It is a copper blackening agent and will also blacken zinc. The copper tellurate solutions of my invention effect a plating of copper tellurate on the metallic surfaces to be coated. The natural tellurate provides a color which is normally a chocolate brown rather than actually black, although this color will vary to some extent dependent upon the proportions of copper and tellurate in solution and the metal or alloy to be coated. It is the purpose and function of my solutions to provide variations in not only the specific color of the coating but also the texture thereof; and it is in this regard that modifications of the general nature of my invention as initially set forth, become important.

With respect to the texture of the coating effected by my solutions, an important function is to controllably effect the precipitation or plating of the copper tellurate onto the metallic surface; and to this end, I provide in most of my solutions, as shown by the specific examples (the primary exception being a non-reflective optical type coating), ingredients which act as suppressors or retarders. These are the alcohols, isopropyl alcohol and methanol, glycerin, and the aerosols. These ingredients act in the solution to slow down the depositing of copper tellurate and tend to produce a dense tight finish. The aerosols also act as wetting agents in the solution. With respect to the use of any specific suppressor, that is, methanol, glycerin, or isopropyl alcohol and the quantity thereof in any specific solution, such depends upon the desired effect or texture of the finished coating. Experimentation by any mechanic skilled in this art will easily indicate the quantity of any specific retarder or suppressor necessary in any specific solution to produce a desired effect. I have observed that either glycerin or isopropyl alcohol, as a suppressor or retarder, produces a brighter finish than does methanol. As I have previously noted, these suppressors or retarders, that is, the methanol, isopropyl alcohol, glycerin and the aerosols, are introduced or added to the solution after the copper sulfate and not directly after the acid to prevent an adverse interaction between the suppressors and the acid content of the solution.

The zinc salt, and specifically zinc sulfate shown in the the specific examples, has various functions in my preferred solutions. First, I have noted in some solutions that the ammonium molybdate is not completely stable and precipitates are formed after a period of time. I have found that by the inclusion or addition of zinc sulfate to such solution, the precipitation is eliminated and the solutions are maintained stable. Thus, the zinc sulfate acts as a stabilizing agent in the solutions. Second, it has additional functions which are somewhat dependent upon the metallic surface to be coated. With respect to coating aluminum or aluminum alloys with my solution, I have found that the zinc sulfate aids in effecting a faster coating of the copper tellurate; and I believe this is accomplished by effecting a coating of zinc over the aluminum surface prior to the precipitation or coating of copper tellurate. The zinc has a particular affinity for aluminum; and through the use of a zinc salt, and specifically I have used a zinc sulfate although I believe other zinc salts would be effective, I believe that a coating of zinc is initially deposited from the solution onto the aluminum, and the tellurium or tellurate of the copper-tellurate having the capacity to blacken zinc as well as aluminum seems to produce a faster and more effective blackening and coating of the aluminum and its alloys when the zinc salt is included in the solution than when it is omitted. The zinc sulfate seems to have a similar effect in the coating or coloration of iron and steel surfaces. With respect to the copper and its alloys, the zinc sulfate's principal functions is to provide a wider variation of color selectivity. Since the tellurate has the ability to blacken zinc as well as the copper, I find that its inclusion in the solution for coloring copper and its alloys tends to produce a darker or blacker color than could be effected without the inclusion of the zinc sulfate. Varying the relative proportions of the zinc salt and the copper salt in solution can produce variations in the color of the coatings.

The effect of my solutions on a metallic surface is not only produced by the actual coating of a blackened copper or copper-tellurate but is also effected by chemical oxidation of the surface to be coated through the acid content of the solution. Therefore, the particular acid content of my solution is a variable one which can be varied to produce different effects of color and texture. In addition to the specific acid content set forth in the specific examples, which as already mentioned may be varied in proportions to give different effects, other oxidizing agents may be used in my solutions to produce various colors and effects. In connection with the use of my solutions to color or coat copper and its alloys, I have used sodium dichromate as an oxidizer or oxidizing agent to produce a darker color free of red. I have also used oxalic acid as an oxidizer to vary the end effect of any specific solution on copper or its alloys.

The color and texture of any specific solution is controlled by variations in the ingredients of the solution, the proportions of these ingredients, and immersion time. Because of the variations in the composition of various alloys, it is difficult to set forth any particular criterion for variations of the ingredients of the solutions and the quantities thereof in any specific solution. At least to date, I have found no specific criterion controlling the limits of modification. However, with respect to the acid content of the solutions, I have found that if there is insufficient acid content in a solution as applied to a metallic surface, one to three hours after immersion of the metal into the solution, or after application of the solution to the metal, a supplementary action takes place which is detrimental to the finish. This supplementary action or indication of the insufficient acid content is recognized as a sweating of the metal, that is, moisture appears on the surface thereof. If the acid content is too high in any specific solution as applied to a specific metal surface, a true coating is not effected but merely a black smut. Apparently, the coating is removed by the acid content as fast as it is applied; and this is an indication of an upper limit of the acid content. These two limits of the acid content of any specific solution vary with respect to the metallic surface to be coated and the particular acids making up the acid content; and I have not observed any specific formula for determining these limits of the acid content but such must be determined by experimentation.

Upon being given a color and texture desired by a user on any specific metallic surface, I start with one of the specific formulas hereinbefore given depending upon the metal to be coated. By varying the acid content and the salt content, that is, varying the type of acid and quantities thereof in solution and varying the copper salt and in some cases the zinc sulfate in relation to each other and in relation to the sodium tellurate, and in some cases adding nickel sulfate, I am generally able to reproduce the color desired. It is also possible as is obvious, that the time of immersion can be varied to vary the shade of color desired. The shorter the time of immersion, the lighter the shade. By increasing the time of immersion, the shade can be darkened.

One particular point which might be mentioned with respect to modifications of my solutions is that selenium and sulfur compounds are both compatible in my solutions and can be used if desired as blackening agents with the tellurium in solution. This does not appear to be a significant modification of my invention, however, I have used selenium in solution with the tellurium to obtain a certain color of green on copper or copper alloys. By reference to selenium in solution, I mean that it is in solution as an oxygen acid thereof or as a generally water soluble salt thereof analogous to sodium tellurate.

One point should be clarified so that the scope of my invention is more clearly understood. Specifically, I have disclosed that the blackening agent or tellurium is in solution as the sole sodium tellurate, which is formed by starting initially with the readily available tellurium dioxide and which is acted upon as set forth to form the sodium tellurate. It should be understood by one skilled in the art that the tellurium might be in solution as one of the oxygen acids thereof, that is, tellurous or telluric acid, or in solution as a salt soluble analogous to sodium tellurate, such as potassium tellurate or sodium or potassium tellurite. If tellurium is in solution either as an oxygen acid thereof or as a tellurite, the ultimate effect is to form a tellurate, which may occur to some extent in solution or at least it occurs upon oxidation of the coated metallic surface.

With respect to using an oxygen acid of tellurium in place of a salt thereof, and specifically sodium tellurate, I have dissolved the metal tellurium in nitric acid beefed up with hydrogen peroxide to form telluric acid. I have used ¾ of a fluid ounce of nitric acid, one ounce of hydrogen peroxide, and one ounce of the metal tellurium to form approximately 1½ ounces of telluric acid. Although this would vary with respect to the specific solution in accordance with my invention, I have used in a 54-gallon batch of solution, between 3 and 12 pounds of telluric acid in place of and to be substituted for the sodium tellurate.

With respect to a further modification of my invention, I have found that it is possible to provide a solution for blackening copper and bronze which does not contain any copper in solution but which makes use of the copper of the metal to be coated to form the copper-tellurate coating. In regard to this modification, I have made solutions for blackening copper or bronze which comprises the sodium tellurate dissolved in water and acid and having added thereto a zinc molybdate solution. The zinc molybdate solution is formed by dissolving zinc sulfate and ammonium molybdate in water. I have found that if I add the ammonium molybdate catalyst directly to the solution consisting of the sodium tellurate in water and acid, there occurs a precipitation of a molybdate; however, by first forming the zinc molybdate solution and then adding it to the sodium tellurate solution, the resulting solution is maintained stable. This type of solution is formed generally in the same respects as the previously discussed solutions of my invention wherein the acid content is of the same general character and suppressors such as isopropyl alcohol, methanol or glycerin may be added. In essence, this modification differs from the nature of my solutions as described hereinbefore insofar as the cupric ion or copper sulfate is omitted from solution and the ammonium molybdate is added to the solution in the form of a zinc molbydate solution.

It is believed that the effect of my solution is more than a mere coating and there there is actually a chemical reaction or interaction between the metallic surface coated and the solution so that the copper tellurate is absorbed in and becomes an integral part of the metallic surface coated. The coating effected by my novel and improved solution forms not only a particularly desirable color or texture for metallic surfaces but is also a protective coating.

It should be understood that this disclosure is intended to be illustrative only and to provide persons skilled in this art with the ability to practice my invention in the formation of suitable solutions and to proceed therefrom with various modifications and improvements within the scope of my invention herein disclosed. I have developed various modifications of ingredients and proportions of ingredients to effect specific surface coatings as might be desired by users of my solutions. It would not be feasible to set forth all of these specific examples already formulated by me or which could be formulated within the scope of my invention. Variations in the ingredients and proportions may be accomplished by any one skilled in this art; and the specific effect of any specific solution must be determined by experimentation therewith. I intend to be limited solely by the scope of my invention as claimed.

What I claim is:

1. A copper-tellurate solution for coloring and coating metallic surfaces consisting essentially of a water soluble inorganic cupric salt, tellurium in solution as an element in the class of materials consisting of an oxygen acid thereof and a generally water soluble salt thereof and a salt thereof generally soluble in an acidic water solution, a water soluble accelerator compatible with the other elements of solution to maintain solution and consisting of a complex salt in which the anion is of the class consisting of molybdates, vanadates, chromates and manganates, and an aqueous acidic solvent; a one-gallon solution comprising about 3 to 10 ounces by weight of the tellurium material, 3 to 10 ounces by weight of the cupric salt and at least about ½ to 4 ounces by weight of the accelerator.

2. A copper-tellurate solution for coloring and coating metallic surfaces consisting essentially of a water soluble inorganic cupric salt, sodium tellurate, an accelerator consisting essentially of ammonium molybdate, and an aqueous acidic solvent comprising water and acid, said acid being compatible with the other elements of solution to maintain solution and capable of dissolving the surface oxide to be coated; a one gallon solution comprising about 3 to 10 ounces by weight of the sodium tellurate, 3 to 10 ounces by weight of the cupric salt, and at least about ½ to 4 ounces by weight of the ammonium molybdate.

3. The solution defined in claim 2 in further combination with organic coating retarders or suppressors from the class consisting of isopropyl alcohol, glycerin, methanol, and animal glue, which act to retard the deposit of a copper-tellurate coating and thereby producing a dense type finish.

4. A copper-tellurate solution for coloring and coating metallic surfaces consisting essentially of copper sulfate, sodium tellurate, an accelerator consisting essentially of ammonium molybdate, an organic coating retarder from the class consisting of iso-propyl alcohol, methanol, glycerin, and animal glue, and an aqueous acidic solvent comprising water and acid from the class consisting of one and a combination of more than one of the active acids hydrochloric, nitric, phosphoric, and fluoboric; a one-gallon solution comprising about 3 to 10 ounces by weight of the sodium tellurate, 3 to 10 ounces by weight of the copper sulfate, and at least about ½ to 4 ounces by weight of the ammonium molybdate; the acid and salt and retarder contents of the solution being variable in materials and proportions to provide variations in the texture and color of the coating formed on the metallic surface, the variations in and selectivity of materials being limited solely by the requirements that the solution be acid and sufficiently acid that the metal surface coated will not sweat after application of the solution, that the solution be maintained without precipitates, and that the solution achieve a true coating as contrasted with a loose temporary coating similar to smut.

5. The solution defined in claim 4 which further consists of a zinc salt compatible in the solution so as not to form a precipitate and in an amount of about 1 to 6 ounces by weight in a one-gallon solution.

6. A copper-tellurate solution for coloring and coating metallic surfaces consisting essentially of copper sulfate, sodium tellurate, an accelerator consisting essentially of ammonium molybdate, and an aqueous acidic solvent comprising water and acid from the class consisting of one and a combination of more than one of the active acids hydrochloric, nitric, phosphoric, and fluoboric; a one gallon solution comprising about three to ten ounces by weight of the sodium tellurate, three to ten ounces by weight of the copper surfate, and at least about one-half to four ounces by weight of the ammonium molybdate.

References Cited in the file of this patent

UNITED STATES PATENTS

| 2,008,753 | Downing et al. | July 23, 1935 |
| 2,303,350 | Fuller | Dec. 1, 1942 |
| 2,322,208 | Loose et al. | June 22, 1943 |
| 2,371,143 | Barnum et al. | Mar. 13, 1945 |
| 2,400,573 | Prutton | May 21, 1946 |
| 2,473,703 | Cotton et al. | June 21, 1949 |
| 2,475,945 | Clark et al. | July 12, 1949 |
| 2,519,672 | Lawless | Aug. 22, 1950 |
| 2,522,474 | Waitkins et al. | Sept. 12, 1950 |
| 2,527,232 | Scroxton | Oct. 24, 1950 |
| 2,634,224 | Faucher | Apr. 7, 1953 |
| 2,679,475 | Singler | May 25, 1954 |
| 2,841,542 | Manquen | July 1, 1958 |
| 2,846,343 | Mason | Aug. 5, 1958 |

OTHER REFERENCES

Meyer et al.: "Ber. Decet. Chem. Ges." 81, pp. 119–123 (1948).

Gregory: "Uses and Applications of Chemicals and Related Materials" (1939), p. 589.

Mellor: A Comprehensive Treatise on Inorganic and Theoretical Chemistry, vol XI, Longmans, Green and Co., New York City, 1931. (Pages 89 and 92 relied on.)